United States Patent [19]

Miller

[11] Patent Number: 4,798,409
[45] Date of Patent: Jan. 17, 1989

[54] VEHICLE BUMPER, ACCESSORIES ATTACHABLE THERETO AND COMBINATION

[76] Inventor: Robert Miller, 67-A Greenpond Rd., Sherman, Conn. 06784

[21] Appl. No.: 915,402

[22] Filed: Oct. 6, 1986

[51] Int. Cl.$^4$ .......................... B60R 19/48; B60R 9/00
[52] U.S. Cl. .................................. 293/117; 293/102; 224/42.03 R; 224/42.07; 280/289 A; 280/769
[58] Field of Search ............... 293/102, 105, 114, 117, 293/1, 115, 122; 224/273, 42.03 R, 42.03 B, 42.04, 42.07, 31, 39; 280/202, 289 A, 760, 769

[56] References Cited

U.S. PATENT DOCUMENTS

| | | | |
|---|---|---|---|
| 1,753,411 | 4/1930 | Gunn | 293/122 |
| 2,551,269 | 5/1951 | Jester | 224/42.03 R |
| 2,576,222 | 11/1951 | Hill | 224/42.03 B |
| 2,880,016 | 3/1959 | Petersen | 293/115 X |
| 3,431,005 | 3/1969 | Priefert | 293/115 |
| 3,831,696 | 8/1974 | Mittendorf et al. | 293/115 X |
| 3,905,527 | 9/1975 | Chamberlain | 293/117 X |
| 3,924,787 | 12/1975 | Gothrup | 224/42.03 B |
| 3,980,217 | 9/1976 | Yochum | 224/42.04 |
| 4,125,214 | 11/1978 | Penn | 293/117 X |
| 4,204,701 | 5/1980 | Oltrogge | 293/117 X |
| 4,277,008 | 7/1981 | McCleary | 280/769 X |
| 4,648,617 | 3/1987 | Hannappel | 280/289 A |

FOREIGN PATENT DOCUMENTS 3518889 11/1986 Fed. Rep. of Germany ...... 293/115

Primary Examiner—Robert B. Reeves
Assistant Examiner—Russell D. Stormer
Attorney, Agent, or Firm—CTC & Associates, Inc.

[57] ABSTRACT

A vehicle bumper for releasably holding an attachment comprises a first face facing upwardly, a second face facing away from the vehicle body, and first and second accessory engaging members including first and second cylindrical surfaces interrupting the first bumper face and spaced from each other longitudinally of the first bumper face. An accessory for releasably engaging the bumper comprises a base plate having a base plate face that faces downwardly and engages the bumper, and first and second bumper engaging elements including first and second cylindrical surfaces interrupting the first base plate face and spaced from each other longitudinally of the base plate face for releasably interengaging the first and second accessory engaging members of the bumper. The cylindrical surfaces of the interengaging members of the bumper or of the accessory are provided by studs projecting from the face interrupted thereby and the cylindrical surfaces of the other interengaging members are provided by holes in communication with the face interrupted thereby.

6 Claims, 3 Drawing Sheets

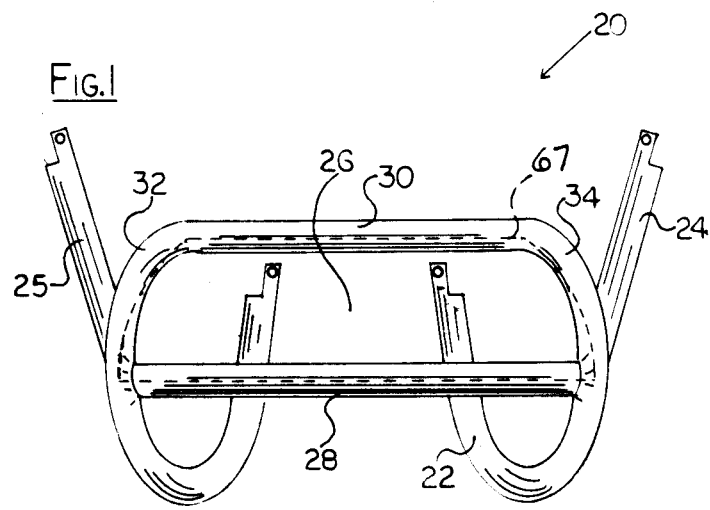
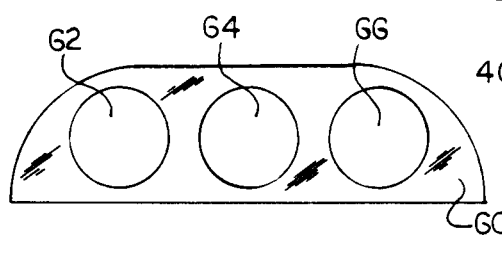
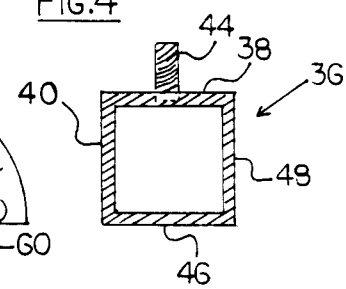
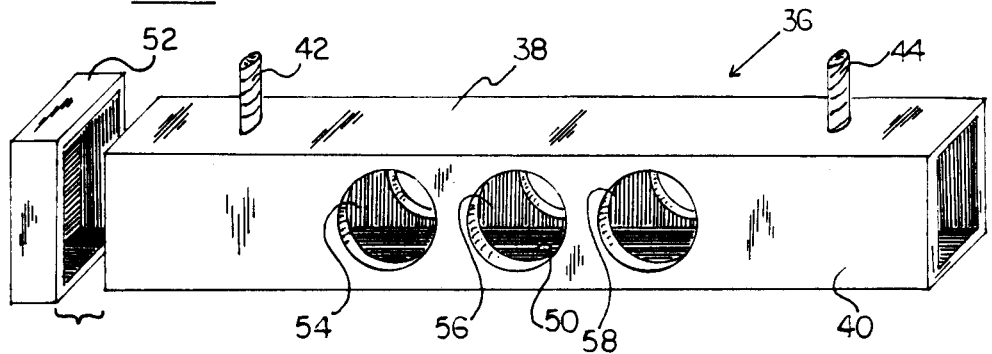
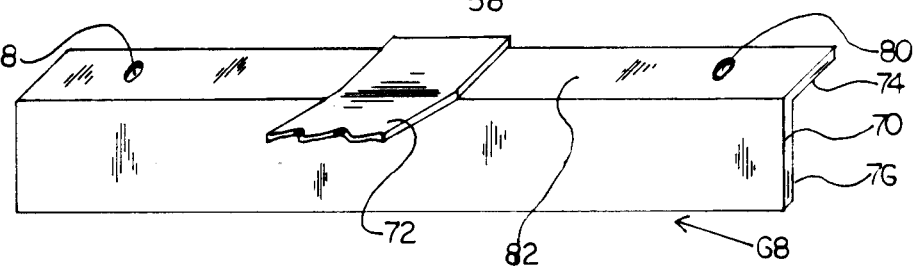

VEHICLE BUMPER, ACCESSORIES ATTACHABLE THERETO AND COMBINATION

BACKGROUND OF THE INVENTION

This invention relates to a vehicle bumper and to accessories attachable thereto and to a combination of such a bumper and such an accessory.

The invention will be described herein as applied to a 1986 Honda TRX 350 4×4 all terrain vehicle, but it is by no means limited thereto.

The reader may be interested in the following prior U.S. patents which were found in a patentability search hereon:

| U.S. Pat. No. | Date | Inventor |
| --- | --- | --- |
| 1,865,365 | June 28, 1932 | Foote |
| 2,425,892 | August 19, 1947 | Michaels |
| 2,499,654 | March 7, 1950 | Kuhlman |
| 2,646,910 | July 28, 1953 | Wiershing |
| 4,214,776 | July 29, 1980 | Nurse |

Foote discloses an adjustable platform for the rear of a tractor. The platform comprises a pair of clips securable to the transmission housing and having perforated vertical portions and hooks, etc. The structure is adjustable for the operator's convenience and is quite complex. The platform is not bumper mounted.

Michaels teaches a pickup bed for a tractor having a horizontal drawbar that is connected to the tractor by two horizontal tension links. The pickup bed comprises a box-like receptacle resting on the drawbar and equally on each side thereof. A pin passes through registering holes in the receptacle and the drawbar to prevent the receptacle from shifting and brackets on the receptacle secure one end of the receptacle to the tension links.

Kuhlman relates to a bracket and supporting attachment to enable farm implements to be carried on the sides of a tractor.

Wiershing discloses a tractor transport box that is attachable to the draft or other carrying structure of various types of agricultural tractors, for carrying medium size loads.

Nurse teaches a transport platform or box that is attachable to a three point hitch assembly of a tractor.

These prior patents do not show or suggest a system for hitching or attaching an accessory to the bumper of a vehicle and further do not show a system for attaching an accessory to any portion of a vehicle in the manner of the present invention and are believed to be irrelevant hereto.

It is an important object of the invention to provide a simple, reliable system for attaching or hitching accessories to vehicles, such as all terrain vehicles.

It is a further object to provide such a system enabling attachment or removal of an accessory to the bumper in a very short period of time, perhaps as little as one minute or even less.

It is an additional object to provide such a system enabling more than one accessory to be attached to the vehicle bumper at the same time, in stacked fashion.

Other objects and advantages will appear hereinafter.

SUMMARY OF THE INVENTION

The invention presents a bumper attachable to a vehicle, such as, for example, an all terrain vehicle, and an accessory that is quickly and releasably engageable with and disengageable from the bumper.

The inventive bumper comprises a first bumper face that faces upwardly when the bumper is mounted on a vehicle, a second bumper face that is vertical and faces away from the body of the vehicle when the bumper is so mounted, and first and second accessory engaging means including first and second generally cylindrical surfaces, respectively, interrupting the first bumper face and spaced from each other longitudinally of the first bumper face for releasably engaging first and second bumper engaging means of the accessory.

More particularly, the first bumper face is generally rectangular and the second bumper face is also generally rectangular and perpendicular to and intersects the first bumper face. The axes of the first and second cylindrical surfaces are parallel to each other and perpendicular to the first bumper face and equally spaced from the common edge of the first and second bumper faces.

In a first preferred bumper embodiment, the first and second cylindrical surfaces of the accessory engaging means are provided by first and second studs, respectively, projecting from the first bumper face.

The bumper further comprises a third bumper face that is generally rectangular and faces downwardly and is spaced below the first bumper face when the bumper is mounted on a vehicle, and a fourth bumper surface that is vertical and faces the body of the vehicle when the bumper is mounted on the vehicle. The first, second, third and fourth bumper faces are provided by a tube of retangular cross section. Caps may cover the ends of the tube, which may be also be provided with drainage holes.

In a second preferred bumper embodiment, the first and second cylindrical surfaces of the accessory engaging means are provided by first and second holes each in communication with the first and third bumper faces.

The accessory can take any of a number of functional forms, such as a winch or a basket for hauling articles on the order of pieces of wood.

The accessory, regardless of its functional form, is, as stated, releasably attachable to a vehicle bumper and comprises a base plate having a first base plate face that faces downwardly and engages the first bumper face when the accessory is attached to the bumper. First and second bumper engaging means include first and second cylindrical surfaces, respectively, interrupting the first base plate face and spaced from each other longitudinally of the first base plate face for releasably interengaging the first and second accessory engaging means of the bumper.

The accessory further comprises a second base plate face that is generally rectangular and is parallel to the first base plate face and faces upwardly and is spaced above the first base plate face when the accessory is mounted on a bumper.

The base plate may also have an additional base plate face that engages the second bumper face when the accessory is mounted on the bumper.

The first base plate face is generally rectangular and, if the third base plate face is present, the third base plate face is generally retangular and the first and third base plate faces are perpendicular to and intersect each other along a common edge.

The axes of the first and second cylindrical surfaces of the bumper engaging means are parallel to each other and perpendicular to the first base plate face. Furthermore, those axes are equally spaced from the common edge of the first and second base plate faces.

In a first preferred accessory embodiment, the first and second cylindrical surfaces of the bumper engaging means are provided by holes in communication with the first base plate face and with the second base plate face.

In a second preferred accessory embodiment, the first and second cylindrical surfaces of the bumper engaging means are provided by studs projecting from the first base plate face.

The first preferred bumper embodiment is usable in combination with the first preferred accessory embodiment and the second preferred bumper embodiment is usable in combination with the second preferred accessory embodiment.

The invention also contemplates the combination of a vehicle and an accessory releasably attached to the bumper. In the combination, the bumper comprises a generally rectangular bumper face facing upwardly, a generally rectangular second bumper face facing away from the body of the vehicle and perpendicular to and intersecting the first bumper face and first and second accessory engaging means including first and second generally cylindrical surfaces, respectively, interrupting the first bumper face and spaced from each other longitudinally of the first bumper face. The accessory comprises a base plate having a generally rectangular first base plate face overlapping the first bumper face. The accessory further has first and second bumper engaging means including first and second generally cylindrical surfaces, respectively, interrupting the first base plate face and spaced from each other longitudinally of the first base plate face. The cylindrical surfaces of one of the engaging means are provided by studs projecting from the face interrupted thereby, and the cylindrical surfaces of the other of the engaging means are provided by holes in communication with the face interrupted thereby. The studs are located in the holes, thereby releasably mounting the accessory and its contents (if any) the weight being borne in large part by the engagement of the first bumper face and the first base plate face. The base plate may also have an additional face, in which case the engagement of the additional base plate face and the second bumper face resists torque tending to bend or break the studs, thus maintaining the accessory in proper position and avoiding damage which could make it difficult to disassemble the parts.

It is a simple matter to mount the accessory on the bumper. It is merely necessary to align the studs with the holes with the first base plate face above the first bumper face and allow gravity to bring the first base plate face into engagement with the first bumper face. The studs preferably are of sufficient length to have exposed free ends to which suitable fastening means may be applied.

In a first preferred embodiment of the combination, the studs interrupt the first bumper face and the holes interrupt the first base plate face, while in a second preferred embodiment the holes interrupt the first bumper face and the studs interrupt the first base plate face. The first embodiment has the additional feature that the base plate of an additional accessory can be mounted on top of the base plate of the accessory that is in direct engagement with the bumper. The inventive bumper can be installed on a vehicle as original equipment or as a replacement for or in addition to an original equipment bumper. The bumper is specifically disclosed herein installed in the latter mode.

Further objects and advantages of the invention will appear hereinafter.

DESCRIPTION OF THE DRAWING

FIG. 1 is a front view of a stock, original equipment front bumper;

FIG. 2 is a perspective view of a first preferred embodiment of a bumper in accordance with the invention, which bumper is to be mounted on the stock bumper of FIG. 1;

FIG. 3 is a front elevation of a plate that is to be used to mount the inventive bumper of FIG. 2 on the stock bumper of FIG. 1;

FIG. 4 is a transverse sectional view of the bumper of FIG. 2;

FIG. 5 is a perspective view of a portion of a first embodiment of an accessory in accordance with the invention, the accessory being useful with the bumper of FIG. 2;

DESCRIPTION OF THE INVENTION

Figure 7:
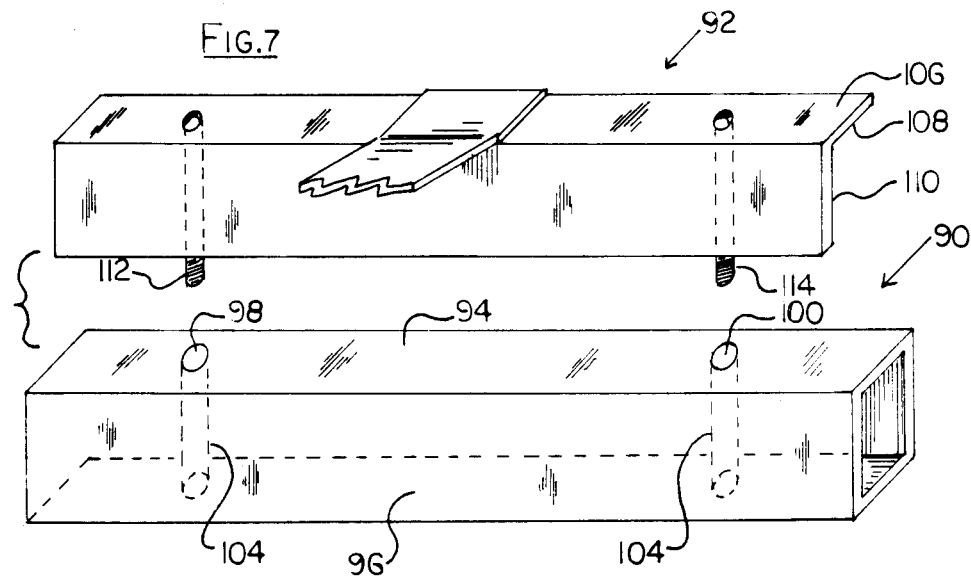
FIG. 7 is an exploded perspective view of a second preferred embodiment of a bumper in accordance with the invention and a portion of a second preferred embodiment of an accessory in accordance with the invention.

FIG. 1 is a front view of a stock or original equipment bumper 20 that is part of a vehicle, such, for example, as an all terrain vehicle. Specifically, bumper 20 is the front bumper of a 1986 Honda TRX 350 4×4 all terrain vehicle. Bumper 20 is formed of tubes that are welded together, specifically, a tube 22, a tube 24, a tube 25 and a tube 28. Tubes 22 and 28 cooperate to provide a closed central opening 26 that is symmetrical with respect to a vertical plane that longitudinally bisects the body of the vehicle. Opening 26 is defined at its bottom by tube 28 which is straight and horizontal, at its top by a horizontal portion 30 of tube 22 and at its ends by outwardly bowed arcuate portions 32 and 34 of tube 22 that smoothly merge with portion 30. Tube 28 is longer than portion 30. Tube 28, and portions 30, 32, and 34 lie substantially in the same vertical plane. Thus, opening 26 is more or less shaped like a trapezoid with the parallel sides provided by tube 28 and portion 30 and the legs by portions 32 and 34. Bumper 20 will be reverted to shortly. FIG. 2 shows, in perspective, a bumper 36 that is a first preferred bumper embodying the invention. Bumper 36 comprises a first bumper face 38 that faces upwardly when bumper 36 is mounted on a vehicle and a second bumper face 40 that is vertical and faces away from the body of the vehicle when bumper 36 is so mounted. Bumper 36 further has first and second accessory engaging means including first and second like generally cylindrical surfaces 42 and 44, respectively, interrupting bumper face 38 and projecting perpendicularly therefrom and spaced from each other longitudinally of bumper face 38. Cylindrical surfaces 42 and 44 are provided by suitably secured threaded studs of ⅜ inch (0.95 cm) thread size.

More particularly, bumper face 38 is generally rectangular as is bumper face 40, and faces 38 and 40 are perpendicular to and intersect each other forming an external angle of 270 degrees. Cylindrical surfaces 42 and 44 are equally spaced from the common edge of faces 38 and 40.

Figure 6:
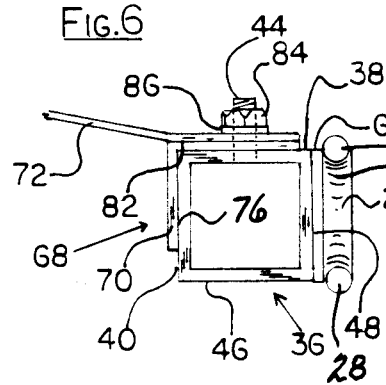
FIG. 6 is an end view of the accessory of FIG. 5 mounted on the bumper of FIG. 2.
Figure 9:
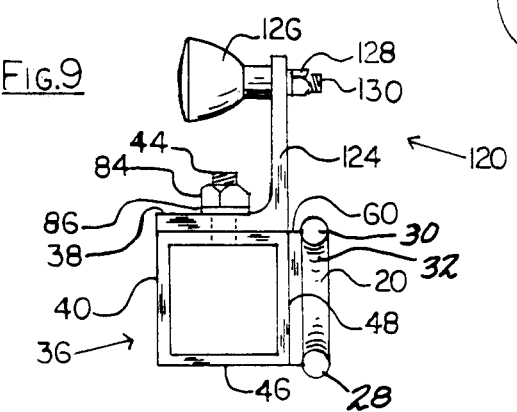
FIG. 9 is a view similar to FIG. 6 but showing a modified accessory mounted on the bumper of FIG. 2.
Figure 10:
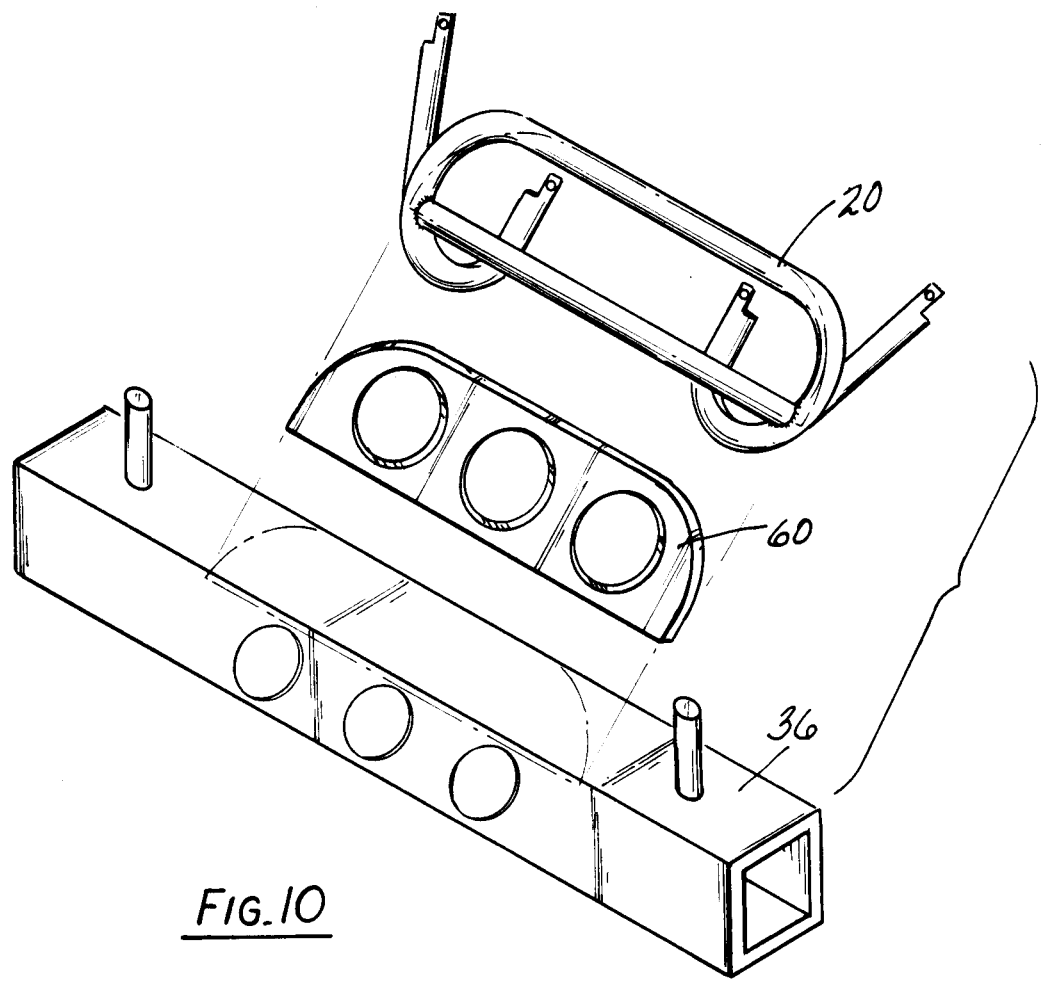
FIG. 10 is an exploded perspective view showing the relationship of the original bumper of FIG. 1, the plate of FIG. 3 and the bumper of FIG. 2.

Bumper 36 further comprises a third rectangular bumper face 46 and a fourth rectangular bumper face 48 (FIGS. 4, 6 and 9). Face 46 is parallel to face 38 and face 48 is parallel to face 40. Face 46 intersects faces 40 and 48 and face 48 also intersects face 38. Face 48 faces the body of the vehicle when bumper 36 is mounted thereon, and face 46 provides the bottom of bumper 36.

Faces 38, 40, 46, and 48 are provided by a tube of rectangular cross section that may be substantially square. The wall of the tube may have drainage holes 50 therethrough, intersecting face 46, and the ends of bumper 36 may be capped, one such cap being indicated at 52 in FIG. 2. The wall of the tube is also shown as having three holes 54, 56, and 58 therethrough, each having a front portion intersecting face 40 and a rear portion aligned with its front portion and intersecting face 48, and about 1.5 inches (3.81 cm) in diameter. Preferably, drainage holes 50 are tapped, to provide means of attaching items to the underside of bumper 36. The thread size of tapped holes may be ⅜ inch (0.95 cm.)

FIG. 3 shows a plate 60 that is used to mount bumper 36 on stock bumper 20. Plate 60 is shaped and sized to overlap opening 26 in bumper 20, and has three holes 62, 64, and 66 therethrough, each about 1.5 inches (3.81 cm) in diameter.

Plate 60 is welded to bumper 20 along dotted line 67 (FIG. 1), and face 48 of bumper 36 is welded to plate 60, with holes 54, 56, and 58 aligned with holes 62, 64, and 66, respectively. Thus, the mounting of bumper 36 on bumper 20 is completed, as shown in FIG. 6. Holes 54/62, 56/64 and 58/66 provide for flow of air to the vehicle engine to cool the same.

FIG. 5 is a perspective view of an accessory 68 that is a first preferred accessory embodying the invention, accessory 68 being useful with bumper 36. Accessory 68 can take any one of a number of functional forms, such as a winch or a basket for hauling wood, for example. Regardless of its functional form, accessory 68 includes a base plate 70 by means of which accessory 68 is releasably attachable to bumper 36. FIG. 5 also shows, fragmentarily, a functional accessory portion 72 welded to base plate 70. Accessory 68 is also shown in FIG. 6.

Base plate 70 has a first base plate face 74 that faces downwardly and engages bumper 36 when accessory 68 is attached to bumper 36 and an additional base plate face 76 that also engages bumper face 40 when accessory 68 is mounted on bumper 36. Base plate 70 further has first and second bumper engaging means including first and second cylindrical surfaces 78 and 80, respectively, interrupting base plate face 74 and spaced from each other longitudinally of face 74 for releasably engaging the first and second accessory engaging means of bumper 36.

Base plate face 74 is generally rectangular as is base plate face 76 and faces 74 and 76 are perpendicular to and intersect each other, forming an internal angle of 90 degrees. The axes of cylindrical surfaces 78 and 80 are parallel to each other and perpendicular to base plate face 74. Also, those axes are equally spaced from the common edge of faces 74 and 76.

Base plate 70 further has an upwardly facing second base plate face 82 parallel to and directly above face 74 and cylindrical surfaces 78 and 80 of accessory 68 are provided by holes in communication with faces 74 and 82.

Studs 42 and 44 of bumper 36 are spaced and sized to be received in holes 78 and 80 of accessory 68, so that accessory 68 is easily mountable on bumper 36 by aligning holes 78 and 80 with studs 42 and 44 and allowing gravity to bring base plate face 74 into engagement with bumper face 38. Studs 42 and 44 will protrude above base plate face 82, and accessory 68 can be readily fastened in place, as by nuts and lockwashers, one such nut and one such lockwasher being illustrated at 84 and 86, respectively, in FIG. 6, which shows the parts fully assembled.

Studs 42 and 44 may be of sufficient length that a plurality of accessories can be mounted on bumper 36 in stacked fashion at the same time.

Furthermore, studs 42 and 44 need not be threaded. Alternatives, which will occur to those skilled in the art, include hairpin-type spring clips, spring loaded latches with release levers and expanding rubber plugs with lever locks.

Figure 8:
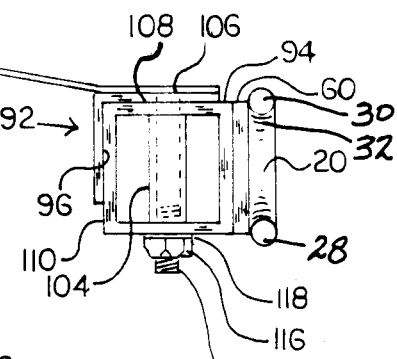
FIG. 8 is an end view of the accessory of FIG. 7 mounted on the bumper of FIG. 7.

FIGS. 7 and 8 show a bumper 90 that is a second preferred bumper embodying the invention and an accessory 92 that is a second preferred accessory embodying the invention. Bumper 90 is similar to bumper 36, having first and second bumper faces 94 and 96, respectively, and first and second accessory engaging means in the form of cylindrical surfaces interrupting face 94.

However, in bumper 90, these surfaces are provided by holes 98 and 100 open at face 94. Bumper 90 further has a third bumper face 102 parallel to and directly beneath face 94. Holes 98 and 100 also communicate with face 102. Sleeves 104 may be included to complete holes 98 and 100 internally of bumper 90.

Accessory 92 is similar to accessory 68, having a base plate 106 having a first base plate face 108 and an additional base plate face 110 and bumper engaging means provided by cylindrical surfaces interrupting face 108. In accessory 92, these cylindrical surfaces are provided by studs 112 and 114 that are spaced, sized, and shaped to enter bumper holes 98 and 100 and pass therethrough to receive fastening means at the lower ends. As shown, studs 112 and 114 are threaded, and accessory 92 is attached to bumper 90 by means of nuts and lockwashers, one such nut and one such lockwasher being shown in FIG. 8 at 116 and 118, respectively.

Once again, studs 112 and 114 need not be threaded. The alternative fastening arrangements, already mentioned, could be used in place of nuts and lockwashers.

FIG. 9 is an end view, similar to FIG. 5, showing bumper 36 with an accessory 120 mounted thereon. Accessory 120 is a variation of accessory 68, and comprises a modified base plate 122, upstanding from which is a bracket 124 that carries a lamp 126, suitably secured to bracket 124, as by a nut 128 in engagement with a threaded stud 130 protruding from the back of lamp 126 and passing through a hole (not shown) through bracket 124, which may an integral part of base plate 122 or a separate piece suitably secured to base plate 122.

Base plate 122 has a first base plate face 132 engaging bumper face 38 and a second base plate face 134. Faces 132 and 134 are similar to faces 74 and 82, respectively, and accessory 120 is mounted on bumper 36 in similar fashion to accessory 68.

However, accessory 120 does not have anything corresponding to additional base plate face 76. It has been found that additional face 76 can be omitted in those cases where the accessory does not apply a torque tending to break or bend studs 44. Accessory 120 is such a non-torque-applying accessory.

It is apparent that the invention attains the stated objects and advantages and others.

The described details are exemplary only and are not to be taken as limitations on the invention except as those details may be included in the appended claims.

What is claimed is:

1. In combination, a supplemental bumper attached to a pre-existing bumper of a vehicle, and an accessory releasably attached to said supplemental bumper, said supplemental bumper comprising a generally rectangular bumper face facing upwardly, and first and second accessory engaging means including first and second generally cylindrical surfaces, respectively, interrupting said bumper face and spaced from each other longitudinally of said bumper face, and said accessory comprising a base plate having a generally rectangular base plate face overlapping said bumper face, and first and second bumper engaging means including first and second generally cylindrical surfaces, respectively, interrupting said base plate face and spaced from each other longitudinally of said first base plate face, said cylindrical surfaces of one said engaging means being provided by studs projecting from the face interrupted thereby, and said cylindrical surfaces of the other said engaging means being provided by holes in communication with the face interrupted thereby, said studs being located in said holes.

2. The combination according to claim 1 wherein said holes interrupt said bumper face and said studs interrupt said base plate face.

3. The combination according to claim 1 wherein said studs interrupt said bumper face and said holes interrupt said base plate face.

4. The combination according to claim 3 wherein said studs protrude above said base plate and said combination further includes an additional accessory having a base plate provided with holes in which said studs are also located.

5. The combination according to claim 1 further comprising a plate and wherein said supplemental bumper is permanently attached to said pre-existing bumper through said plate.

6. The combination according to claim 5 wherein both said bumpers are welded to said plate.

* * * * *